United States Patent [19]

Bubello et al.

[11] Patent Number: 4,825,644
[45] Date of Patent: May 2, 1989

[54] VENTILATION SYSTEM FOR A NACELLE

[75] Inventors: Robert Bubello, Meriden; Jeffrey L. Ream, Tollano, both of Conn.

[73] Assignee: United Technologies Corporation, Hartford, Conn.

[21] Appl. No.: 119,595

[22] Filed: Nov. 12, 1987

[51] Int. Cl.$^4$ .............. F02C 1/00; F02K 1/18; F02K 1/00; F16P 7/00
[52] U.S. Cl. .............. 60/39.091; 60/200.1; 60/271; 60/39.1; 60/39.83
[58] Field of Search .............. 60/39.07, 39.091, 39.1, 60/226.2, 226.1, 271, 39.83; 137/469

[56] References Cited

U.S. PATENT DOCUMENTS

| 3,024,601 | 3/1962 | Nash ................................ 60/226.1 |
| 4,232,513 | 11/1980 | Pearson et al. .............. 60/39.091 |
| 4,474,001 | 10/1984 | Griffin et al. ................ 60/204 |
| 4,493,184 | 1/1985 | Nikkanen ..................... 60/39.07 |
| 4,674,714 | 6/1987 | Cole et al. ................... 244/134 B |

Primary Examiner—Carlton R. Croyle
Assistant Examiner—Robert Blackmon

[57] ABSTRACT

A ventilation system for a nacelle 14 is disclosed. The ventilation system includes pressure relief doors 50 and 52, and a holdback device 68 which blocks each open door from moving from the open position to the closed position.

7 Claims, 4 Drawing Sheets

VENTILATION SYSTEM FOR A NACELLE

DESCRIPTION

1. Technical Field

This invention relates to a powerplant which includes a rotary machine and a nacelle and more particularly to a ventilation system for the nacelle.

2. Background of the Invention

One example of a powerplant employing an axial flow rotary machine is a turbofan gas turbine engine for powering an aircraft and the engine's associated nacelle. The nacelle shelters the engine and provides aerodynamic surfaces which cooperate with the engine for generating thrust.

The turbofan engine includes a compression section, a combustion section and a turbine section. A primary flow path for working medium gases extends axially through the sections of the engine. The working medium gases are drawn into the compression section where they pass through several stages of compression, causing the temperature and pressure of the gases to rise. The gases are mixed with fuel in the combustion section and burned to form hot pressurized gases. These gases are a source of energy to the engine and are expanded through the turbine section to produce work. An engine casing extends axially through the engine and circumferentially about the flow path to bound the primary working medium flow path.

A secondary flow path working medium gases is disposed outwardly of the primary flow path. the secondary flow path is annular in shape. The engine has a plurality of fan blades which extend radially outwardly across the primary flow path and secondary flow path. These fan blades pressurize working medium gases entering both flow paths of the engine.

The nacelle includes a fan nacelle and a core nacelle. These nacelles are often referred to as the fan cowling and the core cowling. The core nacelle is spaced from the engine leaving a core compartment therebetween which extends about the gas turbine engine. The core nacelle is disposed radially inwardly of the fan nacelle leaving a region therebetween for the secondary flow path. An exterior wall of the core nacelle and an interior wall of the fan nacelle bound for the secondary flow path. Thus, as these gases are flowed through the engine, the gases flow over the walls of the nacelles and the walls are contoured to minimize the drag effect that these walls have on the high velocity gases in the working medium flow path.

The core compartment of the nacelle provides an enclosed shelter for engine accessories which are mounted on the exterior of the engine. These accessories might includes fuel lines for flowing fuel to the combustion section, an electrical generator for supplying the engine and aircraft with electrical power and a pneumatic duct for ducting a portion of the compressed gases from the engine through the nacelle and through struts to the aircraft. These gases which can have temperatures in excess of six hundred (600) degrees Fahrenheit at pressures over four-hundred pounds per square inch. The gases may be used, for example, for controlling the environmental conditions of the aircraft and providing anti-icing gases to the aircraft.

A massive malfunction in the nacelle compartment of the pneumatic system or other systems which use pressurized gases will cause a sudden pressure rise in the nacelle compartment. This results in a corresponding force which acts on the interior of the compartment. This sudden force will cause stresses in the compartment which may result in failure of nacelle components such as the hinges or latches or unacceptable deformation of the nacelle. Accordingly, the nacelle system for a modern gas turbine engine typically features some means for pressure relief to prevent damage to nacelle components.

One example of such a pressure relief system is shown in U.S. Pat. No. 4,232,513 issued to Pearson et al entitled Pressure Relief Panel for Aircraft Powerplant. This patent discloses a pressure relief diaphragm disposed in a perforated housing which bursts upon a sudden pressure pulse. After an over-pressurization of the nacelle compartment, the diaphragm may be replaced.

Figure 1:
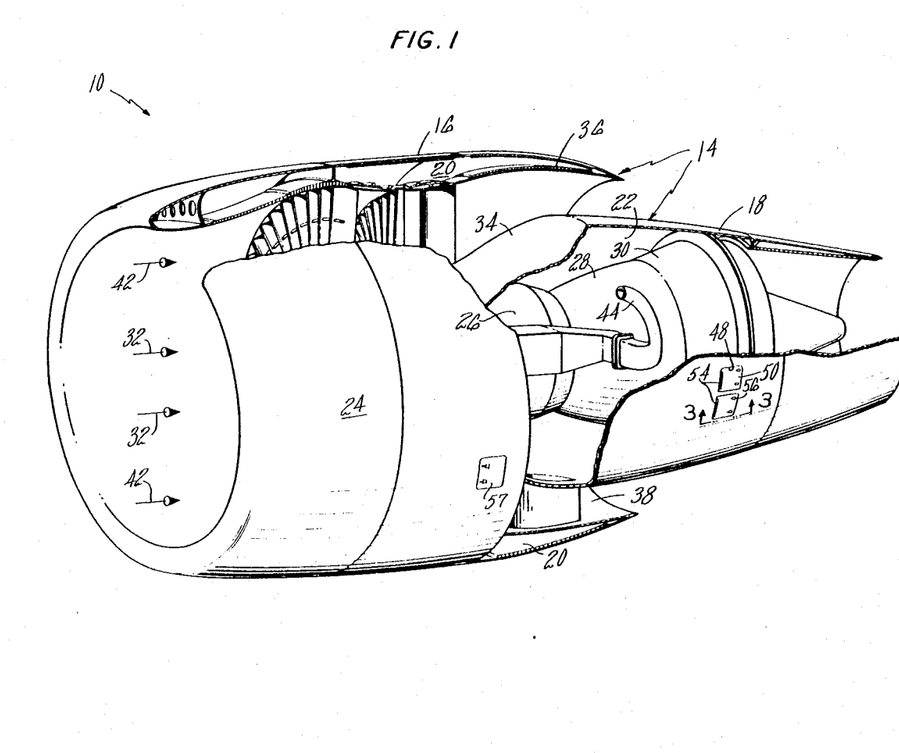
FIG. 1 is a partial perspective view of an axial flow gas turbine engine of the turbofan type mounted in an aircraft nacelle. Portions of the nacelle fan compartment and the nacelle core compartment are broken away to show portions of the engine, a pneumatic duct and pressure relief doors 52, 57 for the core compartment and the fan compartment.
Figure 2:
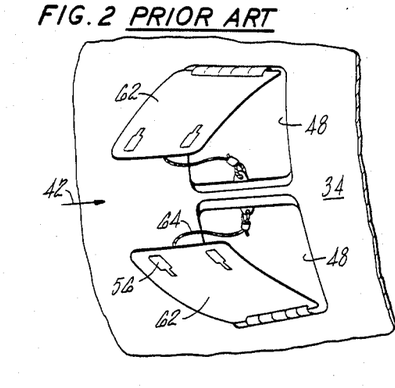
FIG. 2 is a partial perspective view of pressure relief system of the type shown in FIG. 1; however the doors are mounted on the core compartment with the hinge of each door parallel to the fan flow.

FIG. 1 and FIG. 2 show another example of a pressure relief system. This type of system uses pressure relief doors, such as the doors 62, mounted in a wall of the nacelle. The door and the wall are adapted by a hinge to engage each other at a hinged joint. The doors are held shut using spring loaded latches 56. The spring loaded latches open as the pressure on the interior of the nacelle reaches a predetermined level and exerts a predetermined force against the door. Latches for pressure relief doors are available from the Hartwell Corporation, 900 South Richfield Road, Placentia, Calif. 92670.

As shown in FIG. 2 (Prior Art), the hinged joint 58 for each of the doors 62 is oriented parallel to the pressurized air flow from the fan (fan air flow) which passes by the hinges. A cable 64 extends between the door and the nacelle to restrain an opened door against excessive movement away from the nacelle wall. However, the arrangement is unstable inasmuch as variations in flow over the surface of an opened door may cause the door to oscillate toward the closed position and toward the open position. This may cause excessive stresses in the door and in the adjacent nacelle wall 34. In addition, the fan flow moving freely over the outer surface of the nacelle wall and the pressure relief opening acts to suppress exhaust flow from the interior of the nacelle. As a result, the discharge coefficient ($C_D$) of the opening in the nacelle wall in some constructions is reduced to about forty (40) percent of the ideal discharge coefficient.

Figure 3A:
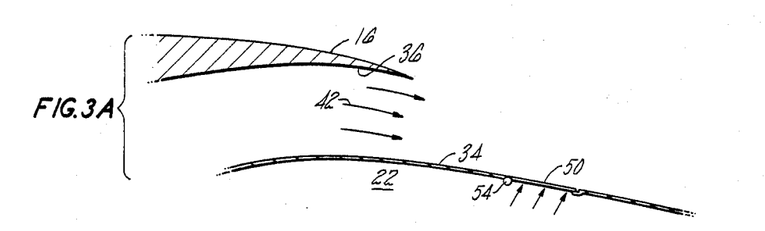
FIG. 3a is schematic representation of the fan compartment and core compartment showing a pressure relief system of the type shown in FIG. 2, but with the door hinge oriented in a direction which extends substantially perpendicular to the approaching flow from the fan bypass duct. The arrows represent leakage flow within the compartment as the pressure is beginning to increase.

An alternative is to position the hinge of the door as shown in FIG. 1 and in FIG. 3a so that the hinged joint is upstream of the pressure relief opening and is substantially perpendicular to the approaching flow. A hinged joint is substantially perpendicular to the fan air flow in constructions where the opened door shields at least eighty percent of the opening from the fan air flow.

During a loss of air from the pneumatic system into the compartment, the initial pressure pulse builds in the compartment, trips the latch, and urges the door to the open position. After a brief transient movement, the door reaches a point of equilibrium between the fan air flow over the door (which urges the door closed) and the exhaust flow from the nacelle compartment (which urges the door open). This position is a function of the steady state leak rate and the operating condition of the engine. The angle between the door and the nacelle wall is referred to as the equilibrium position characteristic.

The equilibrium position of the door reduces the effective exhaust area of the opening to less than the actual area of the opening. This effective reduction in area results in a need for a larger opening (and door area). The larger door requires a more costly and more structurally complex nacelle design to support the pressure relief door, and, increases the closing force exerted by the fan air flow on the door.

Accordingly, scientists and engineers working under the direction of the Applicants Assignee have sought to increase the effectiveness of the pressure relief door to allow for a greater exhaust flow for a given amount of fan air flow and a given amount of door area than is possible with the door designs described above.

DISCLOSURE OF INVENTION

According to the present invention, a nacelle ventilation system adjacent an air stream includes a pressure relief door movable into the air stream to an open position and a holdback device which blocks the door from moving from the open position toward the closed position.

In accordance with one embodiment of the present invention, the nacelle has a nacelle wall which engages the pressure relief door at an upstream hinged joint and the pressure relief door and nacelle wall are provided with a detent mechanism which permits movement of the door in the open direction and prevents movement of the door in the closed direction.

This invention is predicated in part on the recognition that the initial pressure pulse or spike inside a nacelle compartment which opens the pressure relief door causes the door, by reason of the pressure forces and the inertia of the door once the door is set in motion, to move to a more open position than the equilibrium position characteristic of the door. This brief initial pressure rise is intensified because the leaking air from the engine heats the cooler air normally found in the nacelle compartment.

A primary feature of the present invention is a pressure relief door having an upstream hinge. Another feature is a holdback device which blocks movement of the door towards the closed position once the door has moved to an open position. In one embodiment, the holdback device is a detent mechanism. The detent mechanism has a detent and a plurality of interdental notches which the detent engages to lock the door in the open position. In one detailed embodiment, the optimum angle of the pressure relief door (the open position characteristic) is approximately forty degrees (40°) and the door is kept at approximately forty degrees once the door springs open, the door being prevented by a stop from extending too far into the air stream and by the detent device from closing in response to the fan air flow.

A principal advantage of the present invention is the efficient design of a nacelle which results from increasing the effective discharge area of the pressure relief door by reducing the effect that fan air flow has on suppressing exhaust flow through the door. Another advantage is the efficiency of the ventilation system which is enhanced by the ejector effect of the fan air flow flowing by and over the pressure relief door. A further advantage is the protection of the nacelle from damage caused by an open, movable door which results from positively restraining the door against movement while the door is in the open position.

Finally, an advantage is the positive visual indication of a pneumatic system malfunction which is evidenced by the door being locked in the open position.

The foregoing features and advantages of the present invention will become more apparent in light of the following detailed description of the best mode of carrying out the invention and in the accompanying drawings.

BEST MODE FOR CARRYING OUT THE INVENTION

A powerplant 10 for a aircraft is shown in FIG. 1. The structure of the powerplant includes a gas turbine engine 12, a pylon (not shown) and a nacelle 14. The engine is of the axial flow, turbofan type. The pylon supports the engine from the aircraft. The nacelle 14 circumscribes the engine.

The nacelle 14 includes a fan nacelle 16 (commonly called a "fan cowling") and a core nacelle 18 (commonly called a "core cowling"). The nacelle has compartments for housing auxiliary equipment such as a nacelle fan compartment 20 and a nacelle core compartment 22.

The turbofan engine 12 includes a fan section 24, a compression section 26, a combustion section 28 and turbine section 30. A primary flow path 32 for working medium gases extends rearwardly through these sections of the engine. The core nacelle has an exterior wall 34 which extends circumferentially about the engine.

The fan nacelle 16 has an interior wall 36 which is spaced radially outwardly from the fan compartment leaving an annular fan bypass duct 38 therebetween. A secondary flow path 42 for working medium gases extends rearwardly through the bypass duct and over the nacelle walls 34, 36. These walls form aerodynamic surfaces bounding the flow path.

A pneumatic duct 44 is disposed within the nacelle core compartment 22. The pneumatic duct is in flow communication through the outer casing of the engine with the compression section 26 of the engine. The pneumatic duct is broken away for clarity. A portion of the pneumatic duct (not shown) extends from the engine through strut-like conduit 46 which extends between the core compartment and the fan compartment. The pneumatic duct may extend through the fan compartment 20 or may extend through the pylon (not shown) to the aircraft.

The core nacelle 18 bounding the core compartment 22 has a pair of pressure relief openings in the nacelle wall 34, as represented by the single opening 48. A pair of pressure relief doors 50, 52 are disposed in the openings. Each door and the wall 34 have hinges which form a hinged joint 54. The doors are hinged on the upstream side of the opening. Each door has a pair of spring loaded latches 56 responsive to compartment pressure. Similar doors, such as the pressure relief doors 57, may be installed in the fan nacelle.

FIG. 2 is the prior art construction discussed earlier in the "Background of Invention" section of this application.

Figure 3B:
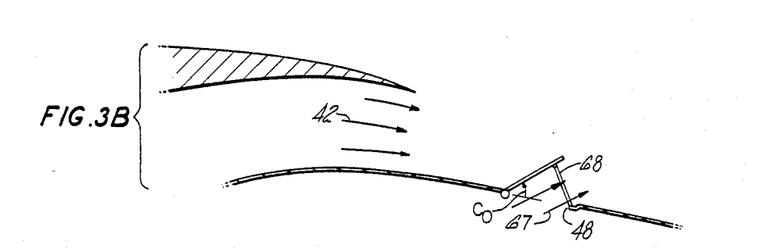
FIG. 3b is a schematic representation similar to FIG. 3a showing the hinged door held at the open position by a holdback device.
Figure 3C:
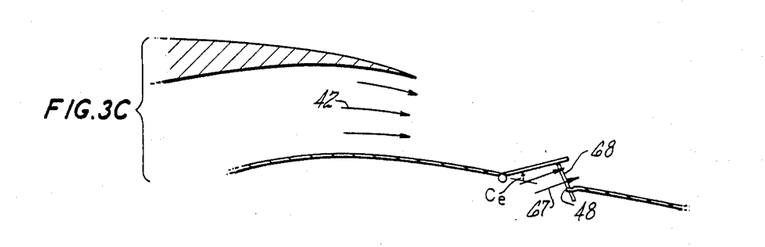
FIG. 3c is a schematic representation similar to FIG. 3b showing the theoretical equilibrium position of the door which results from the exhaust flow through a pressure relief opening and fan flow over the pressure relief door where the door is unsupported by a holdback device.

FIG. 3a, 3b and 3c are figures taken generally along the line 3—3 of FIG. 1. These figures show the relationship of the pressure relief door 50 to the exhaust leakage air which is flowed along the exhaust flowpath 67 through the pressure relief opening 48, and show the relationship of the door 50 to the fan air flowing along the secondary flowpath 42 through the fan bypass duct 38. As noted, each pressure relief door has a hinged joint 54 on the upstream side of the pressure relief door. The door is rotatable about the hinged joint in response to the transient pressure pulse $P_t$ which is beginning to build as shown in FIG. 3a.

As shown in FIG. 3b, the pressure relief door 50 is forced to its initial open position by the transient pressure pulse $P_t$. The angle of the door in this position relative to the nacelle wall is a measure of the position of the door and is referred to as the open position characteristic $C_o$. A holdback device 68 blocks the door from moving inwardly but permits outward movement of the door.

FIG. 3c show the equilibrium position to which the pressure relief door 50 would move if no holdback device 68 were used. The door has closed from the open position moving to the equilibrium position once the steady state exhaust flow is reached. This position results from the pressure force exerted by the fan air flowing over the door and the pressure force exerted by the steady state exhaust flow through the pressure relief opening 48. This theoretical position is a convenient reference angle and is referred to as the equilibrium position characteristic, $C_e$.

Figure 4:
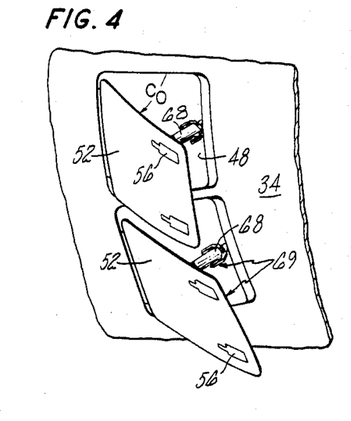
FIG. 4 is a partial perspective view of a portion of FIG. 1 showing the core nacelle, a pair of pressure relief doors in the open position, and holdback devices which engage the doors.

FIG. 4 is a partial perspective view of the pressure relief doors 50, 52 shown in FIG. 1, and in FIGS. 3a-3c, showing each door in the open position. The holdback device 68 extends between each pressure relief door and powerplant structure, such as the nacelle wall 34, to hold the door in the open position. The pressure relief door and holdback device form a pressure relief door assembly 69.

Figures 5, 5A:
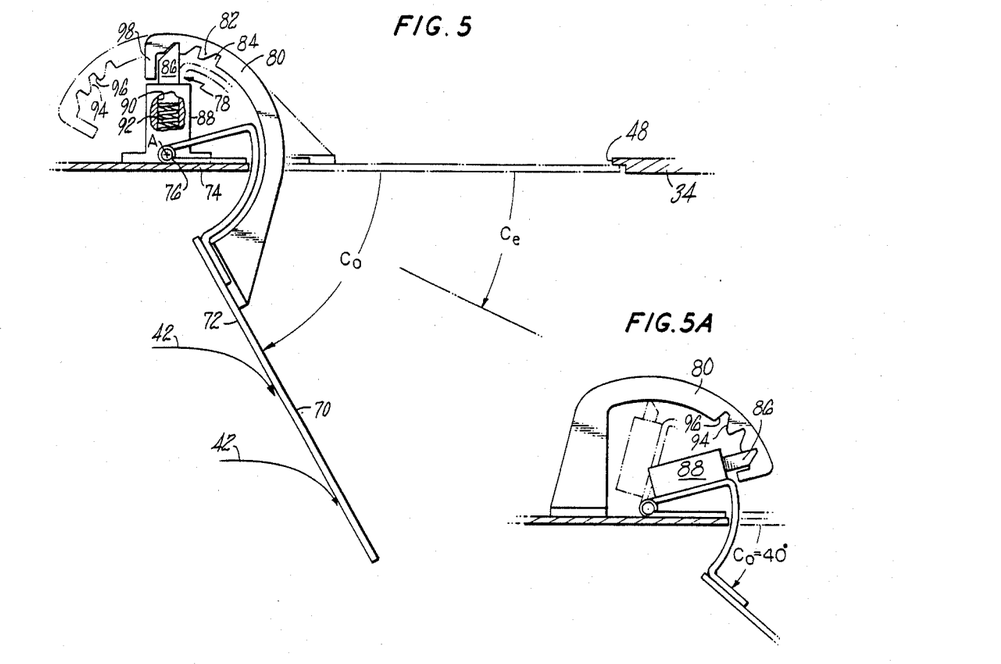
FIG. 5 is a view from above of an alternate embodiment of the holdback device shown in FIG. 4.
FIG. 5a is an alternate embodiment of the holdback device shown in FIG. 5.

FIG. 5 is a view taken from above of an alternate embodiment of one of the pressure relief door assemblies shown in FIG. 4. FIG. 5 shows the position of the pressure relief door 70 in phantom in the closed position; and, in full, in the open position. The pressure relief door is moveable in the direction in which it opens the open directions) from the closed position to the open position, through an equilibrium position $C_e$ shown by the dotted line.

The pressure relief door 70 has an external surface 72. The pressure relief door engages the nacelle wall 34 at an upstream location 74. The door and the wall form a hinged joint 76 upstream of the pressure relief opening 48. The door is rotatable about an axis A. The door is adapted to engage a detent mechanism 78.

The detent mechanism 78 has a first element, as represented by the arcuate element 80, which is engaged by the pressure relief door 70. The arcuate element has a plurality of teeth 82. The teeth are spaced apart leaving interdental spaces 84 disposed between the teeth. The interdental spaces adapt the arcuate member to engage a detent 86.

The detent mechanism 78 includes a detent 86 and a second element, as represented by the housing 88, which is engaged by the nacelle wall 34. The housing extends radially inwardly from the nacelle wall. The housing has a passage 90 which adapts the housing to receive the detent. A resilient means, such as a spring 92, is disposed in the passage. The spring is trapped between the detent and the housing to urge the detent into engagement with the arcuate element 80 engaged by the door. The term "detent" refers to any part of a mechanism (such as a catch, pawl, dog, or other member) that locks or unlocks a movement, permitting motion in a preselected direction.

As shown in FIG. 5, each tooth has a first surface 94 facing in a direction which permits opening of the door (open direction) and a second surface 96 facing the first surface. The first surface has a first slope such that the opening force exerted by the first surface against the detent 86, in the direction which compresses the resilient member, allows a level of compression of the resilient member. This level of compression permits the detent to move relative to and along the first surface as the door moves outwardly to the open position. The second surface has a second slope. The magnitude of the second slope over a portion of the second surface is such that a closing force exerted on the door and transmitted through the second surface to the detent does not urge the detent out of engagement and blocks the door in the open position.

The detent mechanism 78 also includes a stop 98. The stop 98 is engaged by an adjacent portion of the powerplant structure, such as the nacelle wall 34, through the housing 88 and the detent 86 to limit the extent to which the pressure relief door 70 can open.

FIG. 5a is an alternate embodiment of the device shown in FIG. 5 with the positions of the detent 86 and arcuate member 80 reversed. The first surface 94 faces in a direction which permits opening of the door and the second surface 96 faces the first surface. The arcuate member is engaged by the nacelle wall 34. The housing 88 of the detent mechanism is engaged by the pressure relief door.

Figure 6:
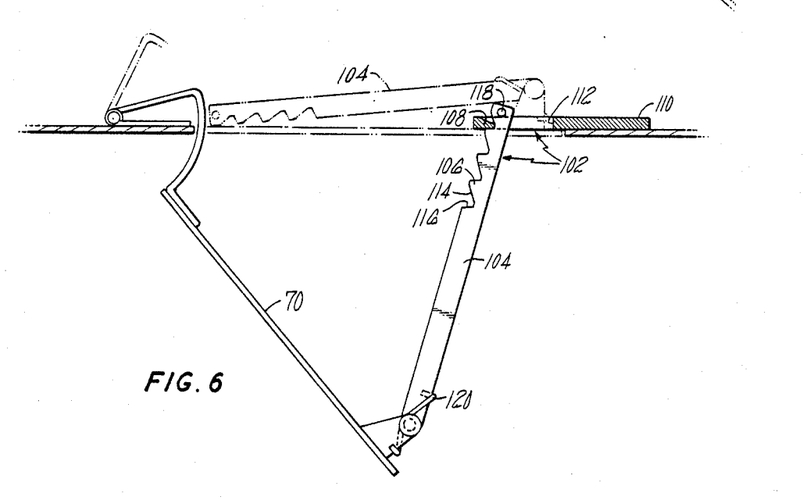
FIG. 6 is an alternate embodiment of the holdback device shown in FIG. 4.

FIG. 6 is an alternate embodiment of the holdback device 68 shown in FIG. 4 which also employs a detent mechanism 102. The relationship of the holdback device to the pressure relief door 70 in the closed position is shown in phantom. The detent mechanism includes a first element, such as the bar 104, which is adapted by teeth 106 to engage a detent 108. The first element is pivotally attached to the pressure relief door. The nacelle wall has a plate 110 which is adapted by an opening 112 to permit the bar to be pulled through opening as the pressure relief door moves from the closed position to the open position. The plate includes the detent 108 which engages the teeth.

The teeth 106 are contoured such that each tooth has a first surface 114 facing in the open direction which permits relative movement between the bar and the detent as the door moves to the open position. Each tooth has a second surface 116 contoured such that relative movement between the bar and the detent is blocked as the door is urged from the open position to the closed position. The bar has a stop, as represented by the limit pin 118 which extends transversely through the member and across the opening 112 to engage the plate 110. A spring 120 urges the member 104 against the detent.

Figure 7:
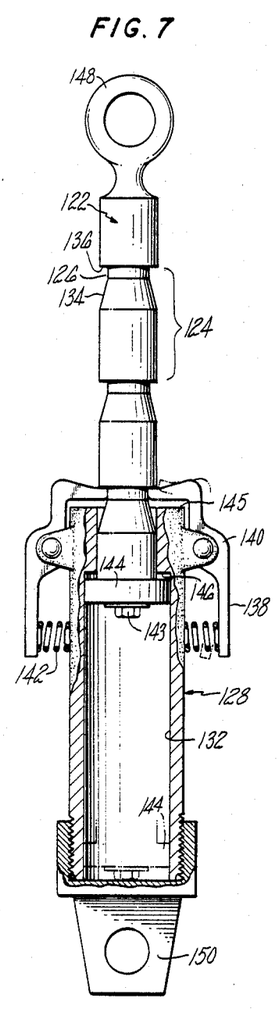
FIG. 7 is one embodiment of the holdback device shown in FIG. 4.

FIG. 7 is one example of the holdback device 68 shown in FIG. 4 for holding open the pressure relief door 50. The open position is shown in full and the closed position is shown in phantom. The holdback device is a tubular variation of the detent mechanism shown in FIG. 5. The device includes a first element, such as the shaft 122, which has a plurality of circumferentially extending teeth 124 spaced apart leaving interdental spaces 126 therebetween. A second member, such as the housing 128, has a passage 132 which adapts the housing to receive the shaft.

Each tooth 124 has a first surface 134 and a second surface 136 which extends radially as a flat plate. A pair of detents 138 are moveable relative to the surfaces of the teeth. Each detent is pivoted at its mid-portion 140. A compression spring 142 is trapped between the detent and the housing to urge the detent into engagement with the teeth. As the door moves from the closed position to the open position, relative movement is permitted between the toothed shaft and the housing. The end 143 of the toothed shaft has a stop 144. The housing has an end 145 having a shoulder 146. The shoulder 146 engages the stop to limit the extent to which the toothed shaft can move. As the door is urged toward the closed position, each detent engages the radially extending flat surface which is contoured to present relative movement between the shaft and the housing.

The detent mechanism is adapted by the end 148 of shaft 122 to engage the nacelle wall member 134 and by the other end 150 of the housing to engage the door member 50. The installation might be reversed such that that shaft engages the door member and the housing engages the wall member.

Figure 8:
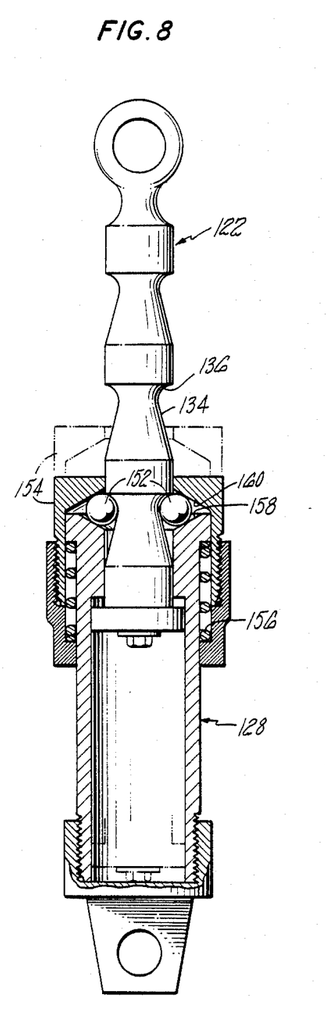
FIG. 8 is an alternate embodiment of the holdback device shown in FIG. 7.

FIG. 8 is an alternate embodiment of the detent mechanism shown in FIG. 7. In this embodiment, the detent is a plurality of spherical balls 152 trapped between the housing 128 and the shaft 122. The balls are held in position by a slidable sleeve 154 which is urged by a spring 156 against the balls.

As the shaft 122 is moved to the open position, the first surface 134 of the shaft exerts a force against each ball. Each ball, in turn exerts a force on the frustoconical surfaces 158, 160 on the housing 128 and on the sleeve 154. This force results in an axial force being exerted on the sleeve which compresses the spring and allows each ball to move outwardly along the frustoconical surface of the tooth to a greater diameter and out of a blocking engagement with the shaft. This permits the shaft to move from the closed position to the open position. The second surface 136 of each tooth is contoured such that, as a closing force is exerted on the housing and on the shaft, the ball engages the second surface on the shaft and the conical surface 158 on the housing so that the detent ball is trapped between the shaft and the housing, is not permitted to move out of engagement, and blocks the pressure relief door from closing.

During operation of the gas turbine engine 12 shown in FIG. 1, working medium gases in the form of air are drawn into the engine. The gases are compressed in the compression section 26, causing the temperature and pressure of the working medium gases to increase. The gases are flowed to the combustion section 28 where fuel is injected into the combustion section and burned with the working medium gases to increase the pressure and temperature of the gases. The hot pressurized gases are expanded through the turbine section of the engine to power the aircraft and to provide energy required to compress the working medium gases in the compression section.

A portion of the working medium gases 32 are bled from the compression section 26, such as from the eighth stage of the compressor or after the fifteenth stage of the compressor, prior to entering the combustion section. As noted earlier, the temperature of these bleed gases may exceed six hundred (600) degrees Fahrenheit and a pressure of four hundred (400) pounds per square inch. These gases are supplied via the pneumatic duct 44 to the environmental control system of the aircraft via the pylon (not shown).

Under normal operative conditions, the core compartment temperature may range from about one hundred and fifty (150) to about seven hundred (700) degrees Fahrenheit and depends on ambient and engine operating conditions. The temperature results from a small amount of ventilation air flow which moves through the core compartment 22 and the transfer of heat from the hot components of the engine to the ventilation air flowing through the compartment.

During a malfunction of the pneumatic air system, such as occurs during a rupture of the pneumatic air duct 44, hot, pressurized bleed gases flood into the core compartment. In addition, the hot gases from the flow path of the gas turbine engine will typically heat ventilation the gases within the compartment causing the pressure of these ventilation gases to rise. The temperature and pressure of the compartment begins to rise at a very rapid rate.

As the pressure and temperature of the gases rise, the gases exert a pressure $P_t$ against the pressure relief doors 52 as shown in FIG. 3a. The doors spring open as shown in FIG. 3b and swing outwardly into the secondary flow path for working medium gases. The holdback devices do not prevent this movement. Relative movement occurs between the detent and the interdental teeth of the detent device used, as discussed earlier, allowing the door to move to the initial open position and allowing the door to have the associated angular characteristic that the door will attain for the particular failure. The maximum amount that the door will move is limited by the stop which engages the adjacent structure. For example, in the FIG. 5 embodiment, the detent 86 engages the stop 98; and, the stop 98 engages the nacelle wall 34 through the housing 88.

After the short period of time of the initial transient (typically less than a second), the exhaust flow through the pressure relief opening exceeds the flow entering the compartment from the engine. These flows quickly equalize as the steady state flow condition is reached.

The open position characteristic of the pressure relief door is selected to provide adequate exhaust flow from the core compartment. After the door is stopped at its maximum position, the door has lost its kinetic energy and the inertial effect that the opening velocity provides. Once this has happened, only the pressure force of the exhaust gases resists the force the fan flow exerts on the door. The force of the fan flow urges the door toward the closed position but the holdback device resists closure of the door. As a result, the door remains open to approximately the maximum angle that the door has reached, the angle depending to a small extent on the spacing between the teeth.

This provides the advantage of decreasing the compartment pressure for a given bleed flow into the core compartment and for a given door area as compared to constructions which orient the pressure relief door as shown in FIG. 3c, but without a holdback device. In such constructions the fan flow is allowed to force the pressure relief door inwardly toward the equilibrium position, which suppresses the exhaust flow from the compartment. Suppression of the exhaust flow causes pressures to result which are calculated to be at least thirty percent higher than the pressures which the compartment encounters using a holdback device.

As will be realized, depending on the amount of leakage flow from the pneumatic systems into the core compartment, the door may or may not reach a maximum open position which is so large that the door is stopped from opening further by the holdback device engaging a stop. In any event, the angular position of the door (open position characteristic) will be larger than the equilibrium position for the leakage flow that does occur because the holdback device will take advantage of the inertia and initial pressure forces acting on the door.

In addition, the upstream hinge for the rigidly supported door causes the fan flow to act as an ejector, increasing the flow from the compartment and directing the flow in the downstream direction. This increases the exhaust flow in comparison to constructions which orient the exhaust flow in a direction which is perpendicular to the thrust developing fan bypass flow.

The tubular constructions of the holdback device as shown in FIGS. 7 and 8 are presently being used over the other designs of the compactness of the design and the weight of the device. Either the housing end 150 or the shaft end 148 of the device could be connected to the door; in present constructions, the shaft end 122 of the device is connected to the door and the housing 129 is connected to stator support structure. The angle of the door is sized depending on the fan flow and the expected exhaust flow of the core compartment based on the predicted failure. This angle may range between forty and seventy degrees. In present constructions, the angle is sized to be about forty degrees (40°) as shown in FIG. 5a. The equilibrium position is calculated to be approximately twenty-five (25°). As will be realized, any angle or opening greater than the equilibrium position will give the advantages of this invention although not to the extent that the optimum position will give.

A final advantage of the present invention is that the pressure relief door 52 and the holdback device 68 provide a positive means of determining whether or not there has been a failure of pneumatic ducting or any other device which could pressurize the compartment. In each of the cases, the pressure relief door will be positively held in the open position. This will call attention to the failure during examination of the core compartment during an after flight check of the engine.

Although the invention has been shown and described with respect to detailed embodiments thereof, it should be understood by those skilled in the art that various changes in form and detail thereof may be made without departing from the spirit and the scope of the claimed invention.

We claim:

1. In a ventilation system of the type used with a gas turbine engine powerplant having structure which includes a nacelle and a gas stream passing over the nacelle from an upstream location to a downstream location, the nacelle having a pressure relief opening in flow communication with said gas stream, the improvement which comprises:
   a pressure relief door disposed in said opening which has a hinged joint upstream of said pressure relief opening about which the door rotates, the door being moveable from a closed position to an open position through an equilibrium point in response to an increase in pressure in said nacelle compartment;
   a holdback device which extends from a portion of said powerplant structure to said relief door to block the door from moving from the open position to the closed position.

2. The nacelle ventilation system of claim 1 wherein the door has an equilibrium position characteristic, and wherein the pressure relief door has an open position characteristic which is greater than said equilibrium position characteristic.

3. The nacelle ventilation system of claim 2 wherein the means for the holdback device for said pressure relief door is a detent mechanism.

4. The nacelle ventilation system of claim 2 wherein the holdback device includes a stop which limits the open position characteristic to a maximum value.

5. The nacelle ventilation systems of claim 4 wherein the maximum value of the open position characteristic is in a range of from forty degrees to sixty degrees.

6. A ventilation system for the nacelle of a gas turbine engine having a gas stream passing over the nacelle, which comprises:
   a nacelle wall member extending circumferentially about the engine and spaced from the engine leaving a nacelle compartment therebetween, the nacelle wall member having a pressure relief opening and adapted to engage a detent mechanism;
   a pressure relief door member disposed in said opening, the pressure relief door having an external surface adjacent said nacelle wall member bounding the gas stream, the door member being adapted to engage a detent mechanism;
   a hinged joint attached to the door member and to the nacelle wall member which is located upstream of the door member and substantially perpendicular to the flow such that the door member is movable from a closed position through an equilibrium position to an open position;

a stop which engages the pressure relief door member and adjacent structure of the nacelle to prevent the door from moving past a predetermined point;

a detent mechanism which includes
- a first element engaged by one of said member, the first element having interdental spaces,
- a second element engaged by the other of said members which is adapted to engage a detent, and,
- a detent, extending from the second element and disposed in the interdental spaces of the first element, the detent being adapted to slidably engage the first element as the pressure relief door is urged in the open direction from the closed position to the open position and being adapted to engage the first element as the door is urged in the closed direction from the open position to the closed position to block the pressure relief door from returning to the equilibrium position.

7. The ventilation system for a nacelle of claim 6 wherein the detent mechanism includes said stop, and further includes;

at least one interdental space which is formed between a pair of adjacent teeth, each tooth having a first surface facing in one of said directions which is engaged by the detent as the pressure relief door is moved to the open position, the first surface having a first slope at any region along said surface, each tooth having a second surface facing said first surface, the second surface having a second slope;

resilient means for exerting a force which urges the detent against said first element having a force characteristic which results in a force as the detent moves with respect to the first element;

wherein the first slope of the first surface is such that a predetermined force urging the pressure relief door to the open position causes a force to be exerted by the first surface against the detent member and by the detent member against the resilient means that allows the detent member to move outwardly and along the first surface and wherein the second slope of the second surface has a magnitude which prevents the first element from exerting a force against the detent which would enable the detent to move from the interdental space to the adjacent interdental space.

* * * * *